United States Patent
Locke

(10) Patent No.: US 7,782,930 B2
(45) Date of Patent: Aug. 24, 2010

(54) OPTIMIZED SHORT INITIALIZATION AFTER LOW POWER MODE FOR DIGITAL SUBSCRIBER LINE (DSL) COMMUNICATIONS

(75) Inventor: Michael E. Locke, Santa Clara, CA (US)

(73) Assignee: Texas Instruments Incorporated, Dallas, TX (US)

( * ) Notice: Subject to any disclaimer, the term of this patent is extended or adjusted under 35 U.S.C. 154(b) by 577 days.

(21) Appl. No.: 11/781,137

(22) Filed: Jul. 20, 2007

(65) Prior Publication Data

US 2009/0022214 A1 Jan. 22, 2009

(51) Int. Cl.
*H04B 1/38* (2006.01)
(52) U.S. Cl. ..................................... 375/222
(58) Field of Classification Search ................... 375/222
See application file for complete search history.

(56) References Cited

U.S. PATENT DOCUMENTS

| | | | |
|---|---|---|---|
| 5,400,322 A | 3/1995 | Hunt et al. | |
| 6,219,378 B1 * | 4/2001 | Wu | 375/231 |
| 6,498,808 B1 | 12/2002 | Tzannes | |
| 6,654,410 B2 | 11/2003 | Tzannes | |
| 6,704,399 B1 * | 3/2004 | Olafsson | 379/93.31 |
| 6,954,505 B2 | 10/2005 | Gatherer et al. | |
| 7,317,754 B1 * | 1/2008 | Remy et al. | 375/222 |
| 2002/0009155 A1 * | 1/2002 | Tzannes | 375/260 |
| 2004/0160906 A1 * | 8/2004 | Greszczuk et al. | 370/311 |
| 2005/0169392 A1 | 8/2005 | Redfern | |
| 2006/0095581 A1 * | 5/2006 | Ali et al. | 709/232 |
| 2006/0176942 A1 * | 8/2006 | Oksman et al. | 375/222 |
| 2007/0109974 A1 * | 5/2007 | Cutillo et al. | 370/254 |
| 2007/0242737 A1 * | 10/2007 | Tzannes | 375/222 |

OTHER PUBLICATIONS

ITU-T G.992.1, "Asymmetric digital subscriber line (ADSL) transceivers" (International Telecommunication Union, Jun. 1999).
ITU-T G.992.3, "Asymmetric digital subscriber line transceivers 2 (ADSL2)", (International Telecommunication Union, Jan. 2005).

* cited by examiner

*Primary Examiner*—Juan A Torres
(74) *Attorney, Agent, or Firm*—Steven A. Shaw; W. James Brady; Frederick J. Telecky, Jr.

(57) ABSTRACT

A digital subscriber line (DSL) system that provides fast exit from an idle state includes a central office (CO) modem for communicating with a customer premises equipment (CPE) modem. Prior to entry into a low-power or idle state for the DSL link between the CO modem and the CPE modem, seamless rate adaptation is performed in order to improve the operating margin from that used in full-on operation, for example by selecting a reduced data rate. Transmission parameters, including data rate, and bits and gains, and corresponding to the improved operating margin are stored at the modems. Upon executing short initialization to return from the idle state, the stored transmission parameters are more likely to be adequate to meet current channel conditions, so the exchange of transmission parameters during short initialization is more likely to be avoided.

24 Claims, 6 Drawing Sheets

OPTIMIZED SHORT INITIALIZATION AFTER LOW POWER MODE FOR DIGITAL SUBSCRIBER LINE (DSL) COMMUNICATIONS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of digital communications, and is more specifically directed to the operation of digital subscriber line communications sessions.

Digital Subscriber Line (DSL) technology has become a primary technology providing high-speed Internet access, and now video and telephone communications, in the United States and around the world. As is well known in the art, DSL communications are carried out over existing telephone "wire" facilities, between individual subscribers and a central office (CO) location, operated by a telephone company or an Internet service provider. Typically, some if not all of the length of the loop between the CO and the customer premises equipment (CPE) consists of conventional twisted-pair copper telephone wire.

Modern DSL communications use multicarrier modulation (MCM) techniques, more specifically discrete multitone modulation (DMT), by way of which the data signals are modulated onto orthogonal tones, or subcarriers. within a relatively wide frequency band (on the order of 1.1 MHz for conventional ADSL, and on the order of 2.2 MHz for ADSL2+), residing above the telephone voice band. The data symbols modulated onto each subchannel are encoded as points in a complex plane, according to a quadrature amplitude modulation (QAM) constellation. The number of bits of data that are carried over each subchannel (i.e., the "bit loading"), and thus the number of points in the QAM constellation for that subchannel, depend on the signal-to-noise ratio (SNR) at the subchannel frequency, which in turn depends on the noise and signal attenuation present at that frequency. For example, subchannels with low noise and low attenuation may carry data in ten-bit to fifteen-bit symbols, represented by a relatively dense QAM constellation with short distances between constellation points. On the other hand, noisy channels may be limited to only two or three bits per symbol, requiring a greater distance between adjacent points in the QAM constellation to resolve the transmitted symbol. The sum of the bit loadings over all of the subchannels in the transmission band for a DSL link of course amounts to the number of transmitted bits per DSL symbol for that link. And the data rate for DSL communications corresponds to the product of the symbol rate with the number of bits per DSL symbol.

FIG. 1 illustrates the data flow in conventional DSL communications, in a single direction (e.g., downstream, from a central office "CO" to customer premises equipment "CPE"). Typically, each DSL modem (i.e., both at the CO and also in the CPE) includes a transceiver (i.e., both a transmitter function and a receiver function), so that data is also communicated in the opposite direction over transmission channel LP according to a similar DMT process. As shown in FIG. 1, the input bitstream that is to be transmitted, typically a serial stream of binary digits in the format as produced by the data source, is applied to constellation encoder 11 in a transmitting modem 10. Constellation encoder 11 fundamentally groups the bits in the input bitstream into multiple-bit symbols that are used to modulate the DMT subchannels, with the number of bits in each symbol determined according to the bit loading assigned to its corresponding subchannel, based on the characteristics of the transmission channel as mentioned above. Encoder 11 may also include other encoding functions, such as Reed-Solomon or other forward error correction coding, trellis coding, turbo or Low Density Parity Check Codes (LDPC) coding, and the like. The symbols generated by constellation encoder 11 correspond to points in the appropriate modulation constellation (e.g., QAM), with each symbol associated with one of the DMT subchannels. Following constellation encoder 11, shaping function 12 derives a clip prevention signal included in the encoded signals to be modulated, to reduce the peak-to-average ratio (PAR) as transmitted as described in commonly assigned U.S. Pat. No. 6,954,505, issued Oct. 11, 2005, and incorporated herein by this reference.

These encoded symbols are applied to inverse Discrete Fourier Transform (IDFT) function 13, which associates each symbol with one subchannel in the transmission frequency band, and generates a corresponding number of time domain symbol samples according to the Fourier transform. As known in the art, cyclic insertion function 14 appends a cyclic prefix or suffix, or both, to the modulated time-domain samples from IDFT function 13, and presents the extended block of serial samples to parallel-to-serial converter 15. Cyclic insertion function 14 may follow rather than precede parallel-to-serial converter 15 in the transmission sequence, in some implementations. In either case, the time-domain serial sequence, as may be upsampled (not shown) as appropriate, is applied to digital filter function 16, which processes the datastream in the conventional manner to remove image components and voice band or Integrated Services Digital Network (ISDN) interference. The filtered digital datastream signal is converted into the analog domain by digital-to-analog converter 17. After conventional analog filtering and amplification (not shown), the resulting DMT signal is transmitted over a channel LP, over some length of conventional twisted-pair wires, to a receiving DSL modem 20, which, in general, reverses the processes performed by the transmitting modem to recover the input bitstream as the transmitted communication.

At receiving DSL modem 20, analog-to-digital conversion 22 converts the filtered analog signal into the digital domain, following which conventional digital filtering function 23 is applied to augment the function of pre-conversion receiver analog filters (not shown). A time domain equalizer (TEQ) (not shown) may apply a finite impulse response (FIR) digital filter to effectively shorten the length of the impulse response of the transmission channel LP. After removal of the cyclic extension from each received block as performed by function 25, serial-to-parallel converter 24 converts the datastream into a number of samples (2N) for application to Discrete Fourier Transform (DFT) function 27. DFT function 27 recovers the modulating symbols at each of the subchannel frequencies, by reversing the IDFT performed by function 13 in transmission. The output of DFT function 27 is a frequency domain representation of the transmitted symbols multiplied by the frequency-domain response of the effective transmission channel. Frequency-domain equalization (FEQ) function 28 divides out the frequency-domain response of the effective channel, recovering the modulating symbols, each representable as a point in a QAM constellation. Constellation decoder function 29 then resequences the symbols into a serial bitstream, decoding any encoding that was applied in the transmission of the signal and producing an output bitstream that corresponds to the input bitstream upon which the transmission was based. This output bitstream is then forwarded to the client workstation, or to the central office network, as appropriate for the location.

In practice, as mentioned above, the data rates achievable for a given DSL loop are generally limited by the level of noise in transmission channel LP. Such noise is typically dominated by crosstalk, both crosstalk in the received signal that results from transmissions in the reverse direction over the same facility (i.e., "near-end" crosstalk, or "NEXT"), and also crosstalk from communications traveling in the same direction in other conductors within the same physical binder (i.e., "far-end" crosstalk, or "FEXT"). Noise not associated with DSL communications, such as narrowband interference from a nearby RF interferer, also adversely affects the achievable data rate.

A measure of the robustness of a transmission system is its "margin". In DSL communications, the margin is typically defined as the amount of additional signal-to-noise margin, at a given data rate, that is beyond the minimum signal-to-noise ratio required for the given line code (e.g., the QAM code). Typical line codes used in DSL communications are characterized by a signal-to-noise ratio gap (i.e., commonly referred to simply as the "gap") $\Gamma$, which is a function of a selected probability of symbol error; the gap $\Gamma$ is effectively a measure of the efficiency of the transmission method on an additive white Gaussian noise channel. According to Shannon's information theory, one can quantify the achievable bit rate $\bar{b}$ of a line code, at a given error probability and a specified bandwidth BW, using the gap $\Gamma$ as follows:

$$\bar{b} = BW \cdot \log_2\left(1 + \frac{SNR}{\Gamma}\right)$$

for a given signal-to-noise ratio SNR. Those skilled in the art will recognize that, from this expression, the bit loading $b_i$ for a QAM modulated subchannel i is derived as:

$$b_i = \log_2\left(1 + \frac{SNR}{\Gamma}\right)$$

Conversely, one may derive the margin $\gamma$ as:

$$\gamma = \frac{SNR}{\Gamma(2^b - 1)}$$

for a current value b of the bits per DSL symbol. This margin is, in effect, the ratio of the current signal-to-noise ratio SNR with the minimum signal-to-noise ratio for the current bit rate b based on the gap $\Gamma$ for the line code being used.

Accordingly, the bit rate (i.e., bits per DSL symbol) of a DSL communications session determines the margin, and thus the ability of the session to tolerate additional noise, or an additional disturbance, or a sudden change in the loop condition. A DSL communications session that is operating at its maximum achievable bit rate $\bar{b}$ cannot tolerate a substantial increase in noise or any other substantial degradation in loop conditions.

Several approaches for changing the bit loadings of an established DSL communications session, for example in light of changes in the channel or operating conditions, are known in the art. According to one approach, referred to as "bit swapping", the number of bits allocated to one or more subchannels is modified during "showtime" (i.e., during live communications of payload data) without interrupting the communications session or requiring retraining of the transceivers. An example of the bit swapping technique is described in commonly assigned U.S. Pat. No. 5,400,322, issued Mar. 21, 1995, and incorporated herein by reference. Bit swapping is also described at §11.2 of the ADSL standard ITU-T G.992.1, "Asymmetric digital subscriber line (ADSL) transceivers" (International Telecommunication Union, Jun. 1999), such standard incorporated herein by reference. In practice, the bits that are removed from the bit loading of one subchannel are added to another subchannel, so that the number of bits per DSL symbol remains constant. As such, the overall data rate is not modified by the bit swapping technique, and either the CO or the CPE modem can initiate the bit swap.

Another technique, referred to as "Seamless Rate Adaptation", or "SRA", permits changes in the bit loadings and data rates, without necessarily changing the parameters involved in forward error correction coding, interleaving, or framing. SRA thus enables changes in the bit loadings and bit rate without interrupting the data flow (i.e., "seamlessly"). According to the SRA technique, the modulation layer is functionally decoupled from the framing layer, so that changes in the bit loadings and the data rate do not affect the framing parameters. Accordingly, SRA modifications do not cause loss of frame synchronization, and thus do not necessarily interrupt data flow. SRA is described in §10.2 of the ADSL standard ITU-T G.992.3, "Asymmetric digital subscriber line transceivers 2 (ADSL2)", (International Telecommunication Union, Jan. 2005), such standard incorporated herein by reference.

By way of further background, the ADSL2 and ADSL2+ standards define certain low power, or quiescent, operating modes for DSL modems. These operating modes are indicated by specific states of the DSL link. The "L2" low power state is a low traffic mode, in which downstream traffic is limited to only background data. Upstream traffic is not affected in the L2 state. As such, the L2 state enables substantial power savings in the CO modem, but little or no power savings for CPE equipment. The "L3" state is a "no traffic" mode, in which both the CO and CPE modems idle and in a very low power condition, with no signal transmitted either in the downstream or upstream directions. The normal operating mode, in which the ADSL link is fully functional, with both upstream and downstream traffic enabled, is referred to as the "L0" state. A description of power management operations involving the L0, L2, and L3 states is provided in §9.5 of the ADSL2 standard ITU-T G.992.3, incorporated by reference above.

As known in the art, and as described in the ADSL2 standard, the CO modem requests entry into the L2 low power state, from the L0 "full-on" state, for example in response to detecting low traffic in the downstream direction over the link over a defined period of time. Upon the CPE modem granting the L2 request, the CO modem can then enter the L2 state. Transition from the L0 state to the L3 "idle" state can be requested by either the CO modem or the CPE modem, for example upon either modem detecting the absence of traffic in either direction for a given time. In response to granting of the L3 state by the non-requesting transceiver, then an orderly shutdown procedure is performed at each side of the DSL link; the CO modem can also effect a "disorderly" shutdown of the link to enter the L3 state, for example if power is suddenly lost at the CPE modem.

The transition from the L2 low power state to the L0 full-on state can be performed quite rapidly at the CO modem. An exit from the L2 state can be requested by either the CO modem or by the CPE modem, in response to which the CO modem returns the link to the L0 state by way of a specified fast exit sequence. Transition from the L3 idle state to the L0 full power state requires an initialization sequence, according to the current standards.

In the ADSL2 and ADSL2+ standards, a "short" initialization sequence is provided for the transition from the L3 state to the L0 state, and also as a fast recovery from significant line condition changes occurring during showtime. This short initialization (also referred to in the art as "fast initialization") is described at §8.14 of the G.992.3 standard, incorporated by reference above. According to this short initialization procedure, certain operations in the full training and initialization procedure are skipped entirely (e.g., the so-called "G.994.1" phase, in which handshaking and the setting of power and spectral shaping parameters occur), and certain other phases are performed over limited durations, as compared to full initialization.

These low power modes and the corresponding short initialization procedure that are permitted under ADSL2 have become especially important considering the many new applications enabled by DSL technology. In practice, many DSL subscribers simply leave their DSL modems, as well as their computers, in an "always on" condition; the L3 idle state thus can save substantial energy over time, and especially as accumulated over a large number of CPE modems. In addition, many subscribers now also use Voice over Internet Protocol (VoIP) for their land-line telephone service, in which case the subscribers make and receive telephone calls via their DSL modems. As such, the initialization process to make a transition from the L3 idle state at the CPE modem into its full-on L0 state must be kept short, for example on the order of one second or less. Any further delay in re-activation of the DSL link becomes especially noticeable to the user, especially if this delay appears to the user in waiting for a dial tone, waiting for the DSL modem to initialize upon answering a call, or in waiting for a receiving VoIP subscriber to initialize his or her CPE equipment upon receiving a phone call from the user.

One of the operations performed in short initialization, over a limited duration, is channel analysis, which determines the characteristics of the transmission channel over the subchannels of the transmission band. As a result of that channel analysis, if the transmission parameters from the previous L0 state for the link are still adequate for the current condition of the line determined in this limited channel analysis, those previous parameters may be recalled from memory at both the CO modem and the CPE modem, and need not be re-communicated in the "exchange" phase of the short initialization procedure. As known in the art, these parameters include the frame multiplexor control parameters $L_p$ that specify the number of bits communicated for each latency path p, in each transmission direction, of each data frame, as defined in the G.992.3 standard incorporated above. The total data rate is thus expressed as $\Sigma L_p$. The parameters to be exchanged in the short initialization process, if necessary, also include the "bits and gains" for each of the subchannels in the transmission bandwidth, in each direction; the "bits" $b_i$ of course specify the bit loading for subchannel i, and the "gains" $g_i$ specify the scale factor to be applied to that subchannel i, relative to the nominal gain for that subcarrier as used in channel analysis.

It has been observed, according to this invention, that the time required to exchange these parameters $L_p$, $b_i$, $g_i$ in this short initialization procedure can be as much as 0.3 seconds. This time is dominated by the exchange of the parameters from the CPE modem to the CO modem (i.e., the so-called R-PARAMS phase), considering that the CPE modem will be communicating the parameters to be applied by the CO for the large number of downstream subchannels (e.g., as many as 512 subchannels), but communicating these subchannels only over the much smaller (e.g., thirty-two) number of subchannels allocated to upstream communications. It is contemplated, according to this invention, that the addition of these 0.3 seconds for parameter exchange to the approximately one second delay required for short initialization will be readily noticeable to the users, especially in making and answering VoIP telephone calls.

BRIEF SUMMARY OF THE INVENTION

It is therefore an object of this invention to provide a communications system and method of operating the same in which the frequency that minimizes the frequency at which parameter exchange is required in short initialization of a DSL link.

It is a further object of this invention to provide such a system and method that can be easily implemented into existing transceiver equipment.

It is a further object of this invention to provide such a system and method that is fully compatible with existing DSL communications standards.

Other objects and advantages of this invention will be apparent to those of ordinary skill in the art having reference to the following specification together with its drawings.

The present invention may be implemented into a DSL communications system, either in the central office (CO) modem or at the customer premises equipment (CPE) modem, by way of logic circuitry that senses low or no communications traffic. Prior to entry into a low power or idle state as a result of the low or no traffic event, seamless rate adaptation is performed to reduce the data rate from that previously used in the communications encoding. Because this data rate reduction is not due to degraded channel conditions, the operating margin of the communications configuration is improved. The resulting communications parameters are then stored at each transceiver. Upon return from the low power or idle state, this additional margin improves the likelihood that the stored parameters can be used to resume the communications sessions, thus avoiding the need for the modems to exchange parameters during a short initialization procedure.

DETAILED DESCRIPTION OF THE INVENTION

The present invention will be described in connection with its preferred embodiment, namely as implemented into digital subscriber line (DSL) modulator/demodulator (modem) equipment, and methods of operating the same according to the asynchronous digital subscriber line (ADSL) communications protocols, particularly the ADSL2 and ADSL2+ standards. However, it is contemplated that this invention will also be beneficial in other loop-based communications systems and protocols according to which entry into and exit from a low power or idle state is performed. Indeed, it is contemplated that this invention is useful in connection with any type of modem system, including single frequency (i.e., using orthogonal codeword modulation for multiple channels) and single channel systems. Accordingly, it is to be understood that the following description is provided by way of example only, and is not intended to limit the true scope of this invention as claimed.

Figure 1:
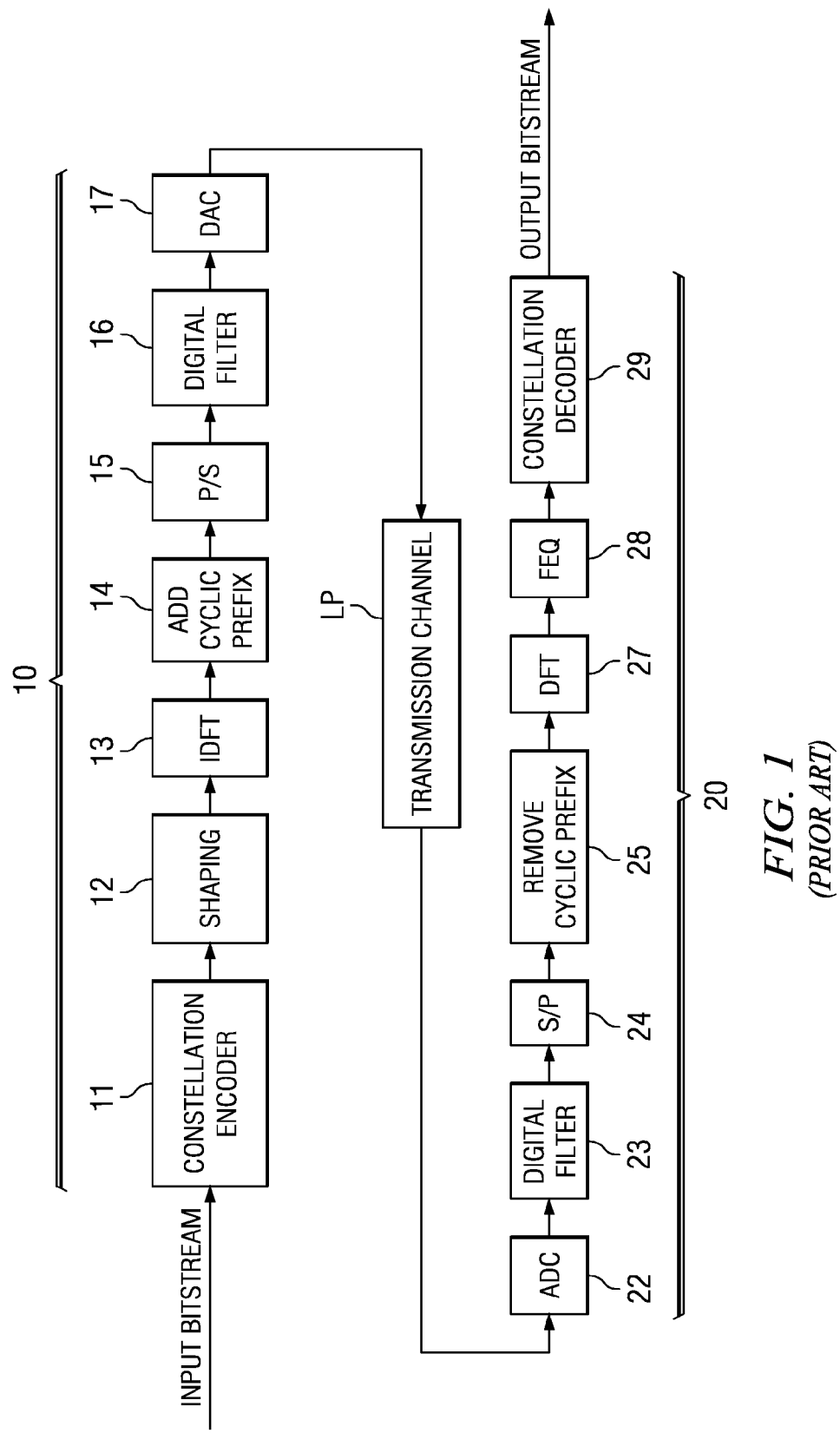
FIG. 1 is a data flow diagram illustrating conventional DSL communications, in one direction by way of example.
Figure 2:
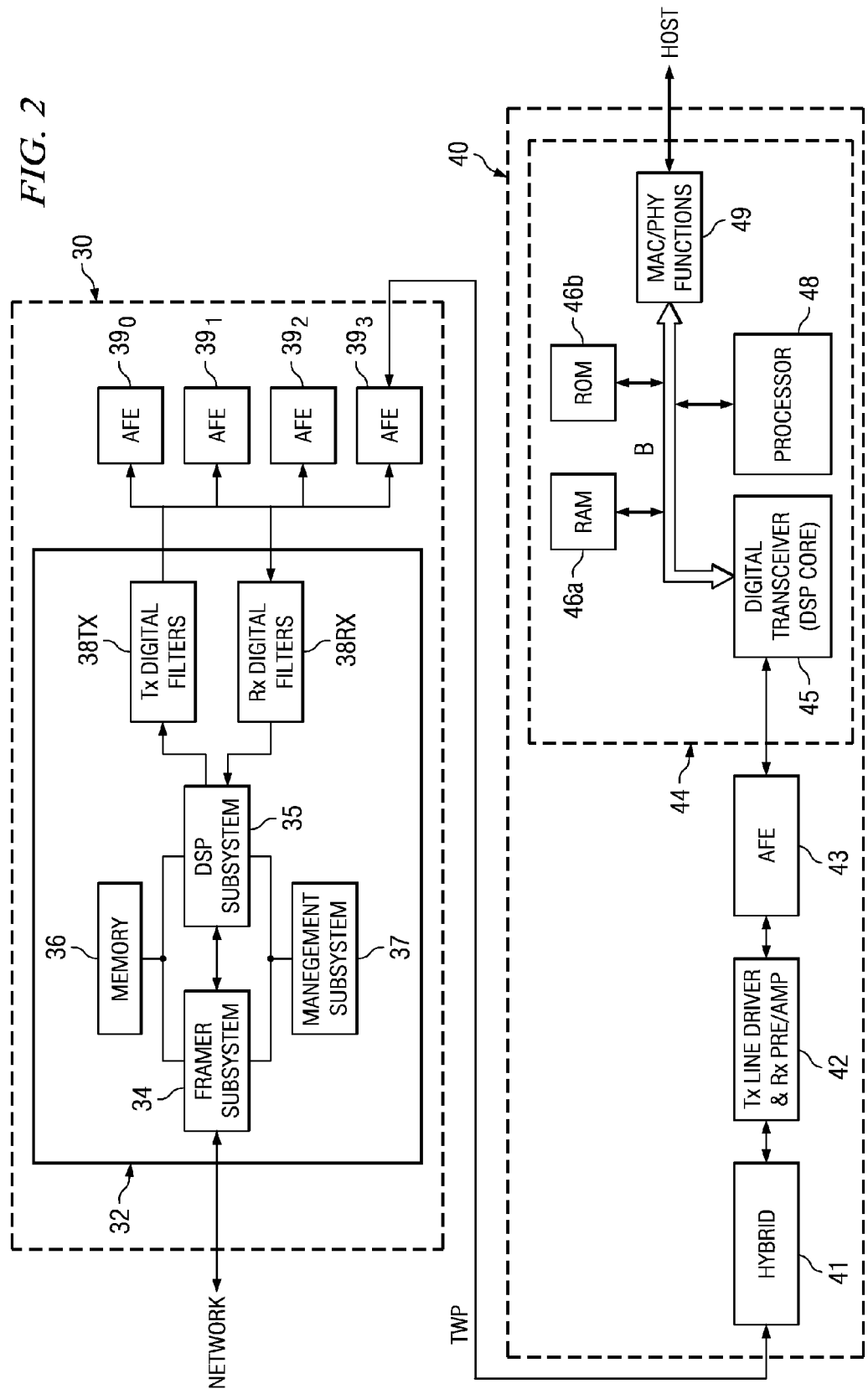
FIG. 2 is an electrical diagram, in block form, of the construction of a DSL link as utilized according to the preferred embodiment of the invention.

Referring first to FIG. 2, the construction of an example of central office (CO) modem 30 and customer premises equipment (CPE) modem 40 in a DSL communications link will now be described, by way of example. The architectures of CO modem 30 and CPE modem 40 illustrated in FIG. 2 correspond to modern implementations of these transceiver systems, as will be evident from the following description. However, those skilled in the art having reference to this specification will readily comprehend that CO modem 30 and CPE modem 40 can be realized by way of other alternative architectures from those shown and described in this specification, and that the architectures shown and described in this specification are presented by way of example only.

CO modem 30 in this example is based on the AC7 ADSL Infrastructure Chipset available from TEXAS INSTRUMENTS INCORPORATED headquartered in Dallas, Tex. As such, CO modem 30 includes transceiver 32, which may be realized by way of the TNETD7160 sixteen-port single-chip transceiver available from TEXAS INSTRUMENTS INCORPORATED; in this example, only four ports are shown as coupled to transceiver 32, by way of analog front-end functions $39_0$ through $39_3$, for the sake of clarity.

Transceiver 32 in this example includes framer subsystem 34, which is a programmable logic function that communicates with the network functions within the central office, and that manages the conversion of network data into and out of the frames used in DSL communications, in the conventional manner. Management subsystem 37 is also provided within transceiver 32, for managing the operation of transceiver 32, including the generation of the necessary system clock signals, interfaces to the user or to host equipment including CO modem 40, power management, and the like. Transceiver 32 also includes DSP subsystem 35, which is programmable logic in the form of a programmable digital signal processor, and which manages DSL transmit functions including constellation encoding, spectral shaping, and inverse DFT modulation, and which also manages DSL receive functions including DFT demodulation, FEQ, and constellation decoding. It is contemplated that DSP subsystem 35 will be realized by a DSP core of sufficient computational capacity to perform these DSL modulation and coding functions for the ports supported by transceiver 32; an example of such a powerful core corresponds to the C62x family of digital signal processors available from TEXAS INSTRUMENTS INCORPORATED. Memory 36 is provided within transceiver 32 for program and data storage as appropriate for the operation of transceiver 32, such program storage including storage of the instruction sequences used in performing the functions described in this specification, according to the preferred embodiment of the invention. DSP subsystem 35 communicates modulated data to be transmitted to transmit digital filters 38TX, while the data to be demodulated by DSP subsystem 35 are received via receive digital filters 38RX. Digital filters 38TX, 38RX are coupled to each of analog front-end functions $39_0$ through $39_3$, in this example.

Each of analog front-end functions 39 includes the conventional analog functions such as a hybrid coupler for bidirectionally coupling to conventional twisted-pair telephone wire, a line driver and a receiver preamplifier for transmit and receive amplification, respectively, analog filters for both the transmit and receive signals, and also a conventional codec (coder/decoder). Digital-to-analog conversion and analog-to-digital conversion functions are also included within analog front-end functions 39, in the conventional manner. An example of a suitable integrated analog front-end function 39 is the TNETD7122 dual-channel integrated front-end, available from TEXAS INSTRUMENTS INCORPORATED.

In this example, analog front-end function $39_3$ is coupled to twisted-pair wire facility TWP, which carries DSL downstream and upstream communications between CO modem 30 and CPE modem 40 in the DSL link shown in FIG. 2 in this example. In CPE modem 40, hybrid coupler 41 is connected to twisted-pair wire facility TWP to maintain separation of upstream signals from downstream signals, and in turn is coupled to transmit line driver and receive preamplifier function 42. Analog front-end function 43 is coupled to line drive and preamplifier function 42, and includes the necessary analog filters, codec, and digital-to-analog conversion (and vice versa) as used for DSL communications in the conventional manner. An example of a suitable analog front-end function 43 for CPE modem 40 is the AFE1302 ADSL analog front-end available from TEXAS INSTRUMENTS INCORPORATED.

In this example, CPE modem 40 includes transceiver 44, which is realized in an architecture corresponding to the AR7 single-chip ADSL transceiver, available from TEXAS INSTRUMENTS INCORPORATED; other suitable architectures and realizations for transceiver 44 in CPE modem 40 include the UR8 residential gateway product family available from TEXAS INSTRUMENTS INCORPORATED. In the example of FIG. 2, transceiver 44 includes digital transceiver function 45, coupled to analog front-end function 43 via the appropriate interface. Digital transceiver function 45 is preferably realized as a DSP core with sufficient computational capacity to perform DSL transmit functions including constellation encoding, spectral shaping, and inverse DFT modulation, and to perform DSL receive functions including DFT demodulation, FEQ, and constellation decoding. Examples of DSP cores suitable for digital transceiver function 45 include those in the C62x family of digital signal processors available from TEXAS INSTRUMENTS INCORPORATED. Digital transceiver function 45 is coupled to random access memory (RAM) 46a, and read-only memory (ROM) 46b within transceiver 44 via bus B. ROM 46b and RAM 46a of course provide program and data storage, respectively, as appropriate for the operation of transceiver 44. It is contemplated that ROM 46b will include program memory storing the instruction sequences used in performing the functions described in this specification, according to the preferred embodiment of the invention.

Transceiver 44 also includes processor 48, which is responsible for management of the operation of transceiver 44, in the conventional manner. According to the AR7 architecture mentioned above, processor 48 may be realized as a thirty-two-bit MIPS microprocessor. Processor 48 is coupled to bus B, as is MAC/PHY function block 49, which performs the higher layer functions on the data to be transmitted and that received over the DSL link, and communicates that data to and from a host system. The specific interfaces for communication with the host system, and with other functions at the location of CPE modem 40 (especially if CPE modem 40 serves as a router, or as a residential gateway for telephone and other services), may also be provided in CPE modem 40, but are not shown in FIG. 2 for the sake of clarity.

As mentioned above, the particular architectures and implementation details described above and shown in FIG. 2 are presented by way of example only. Variations to and substitutes for these modem implementations and architectures may alternatively be used, without departing from the scope of this invention.

Figure 3:
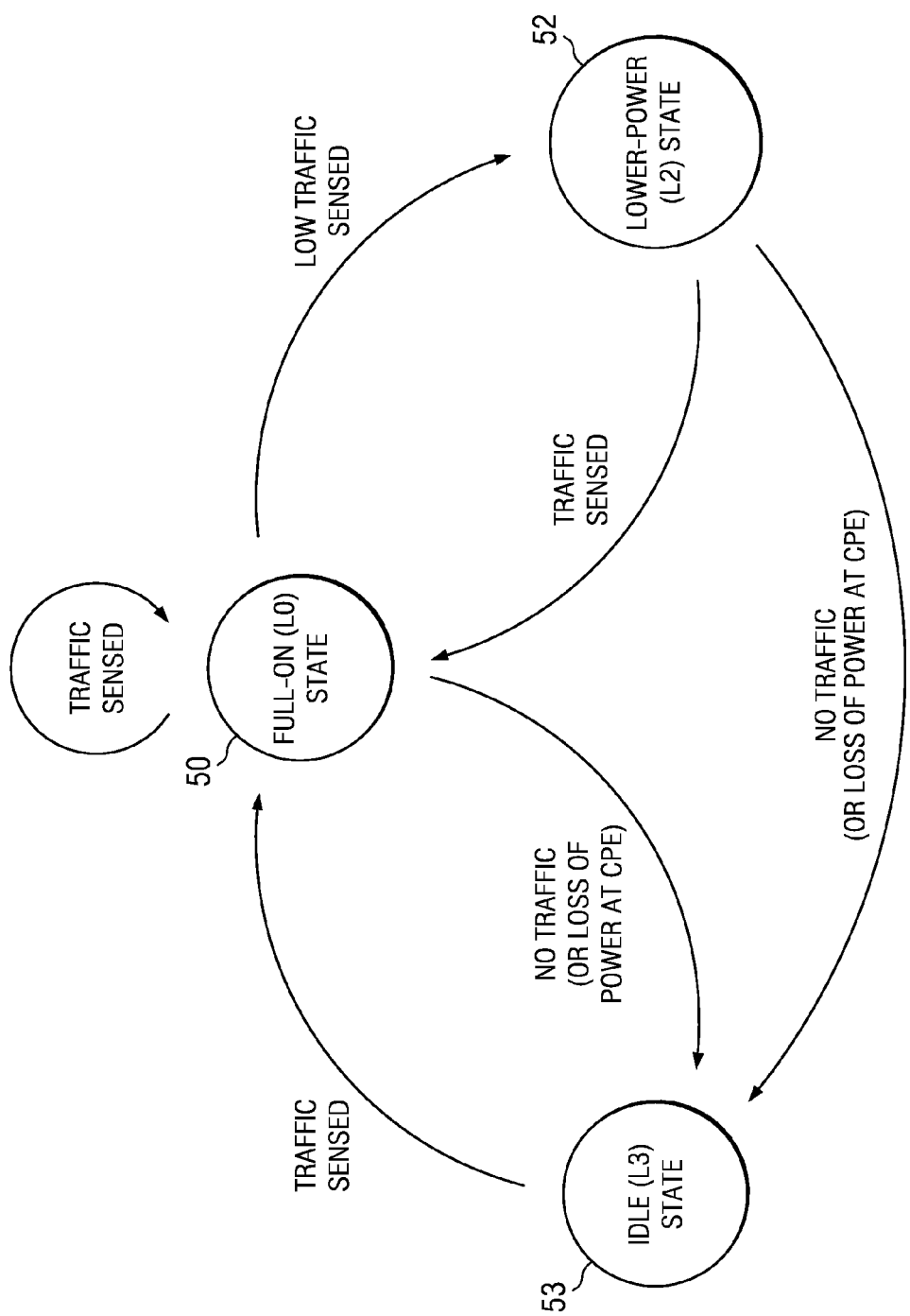
FIG. 3 is a state diagram illustrating transitions among various operating modes according to the preferred embodiment of the invention.

Referring now to FIG. 3, the transition of a DSL link involving CO modem 30 and CPE modem 40, among operating mode L0 and the reduced power modes L2, L3, will now be described. Full-on L0 state 50 of FIG. 3 corresponds to conventional operation of a DSL communications session, in which CO modem 30 and CPE modem 40 are both in a full-on state, transmitting and receiving data in both the downstream and upstream directions. So long as CO modem 30 continues to sense a sufficient traffic level, the DSL link remains in the L0 full-on state, as shown in FIG. 3.

CO modem 30 includes the known functionality in which it is able to sense the volume of downstream data transmitted over time. Typically, as known in the art, CO modem 30 can monitor the number of active asynchronous transfer mode (ATM) cells it transmits over time, and can compare that ATM cell rate against a programmable or preselected threshold value. If the ATM cell rate falls below the threshold value, CO modem 30 can initiate a transition to L2 low-power state 52, in which CO modem 30 (i.e., the portion of CO modem 30 that is supporting the DSL link with CPE modem 40) is placed into a low power mode; in this L2 state 52, however, CPE modem 40 remains fully powered-on. Upon CO modem 30 sensing that downstream traffic is demanded by CPE modem 40, a fast transition back to L0 full-on state 50 is performed.

As described above, the L3 idle state is effectively a shut-down state, in which both CO modem 30 and CPE modem 40 are powered down. Accordingly, upon either CO modem 30 or CPE modem 40 sensing that there is no traffic at all over the DSL link, in either the L0 full-on state 50 or L2 low-power state 52, the sensing modem can initiate a transition into L3 idle state 53 by requesting such a transition of the other modem in the DSL link. L3 idle state 53 can also be entered, via a "disorderly shut down" process, in the event that power is lost at CPE modem 40. Upon the sensing of traffic to be transmitted over the DSL link, or other reestablishing of the link, CO modem 30 and CPE modem 40 can transition back to L0 full-on state 50, by way of a short initialization process.

The details of the transitions from L0 state 50 to L2 state 52 and then to L3 state 53, according to the preferred embodiment of the invention, will now be described with reference to FIG. 4. This description will correspond to this transition in connection with downstream (i.e., CO to CPE) traffic, because it is contemplated that this invention will be especially useful in connection with downstream traffic, especially in the transition to the L3 state via the L2 state. In addition, as described in §10.2.2 of the G.992.3 standard, rate adaptation is initiated from the receiving modem only, which for the case of downstream traffic is CPE modem 40. However, it is also contemplated that, in other implementations, the transmitting modem (i.e., CO modem 30 for downstream traffic, or CPE modem 40 for upstream traffic) may initiate the rate adaptation in connection with the transition to a lower power state. Furthermore, it is contemplated that the majority of transitions to L3 idle state 53 will take place via L2 low-power state 52, rather than directly from L0 full-on state 50. This is because a "no traffic" condition generally appears first as a "low traffic" condition for downstream communications, considering that downstream traffic usually greatly outweighs upstream traffic in most ADSL communications. In addition, because the traffic sensing by CO modem 30 is performed over a sliding time window, cessation of traffic will first appear as a low traffic rate event over that time window.

Figure 4:
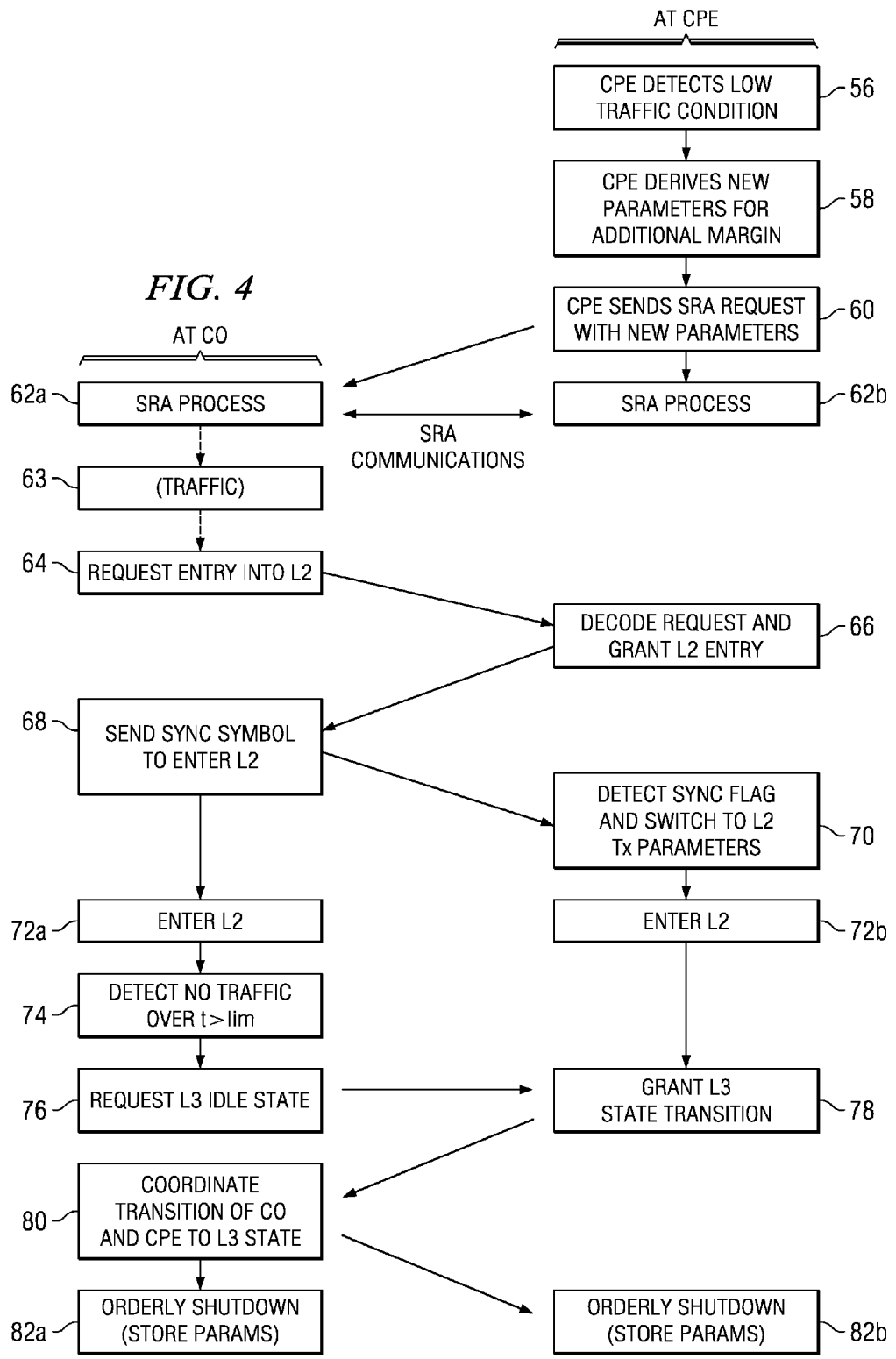
FIG. 4 is a flow diagram illustrating the operation of the central office (CO) and customer premises equipment (CPE) modems in entering the idle L3 state via the low-power L2 state, according to the preferred embodiment of the invention.
Figure 5:
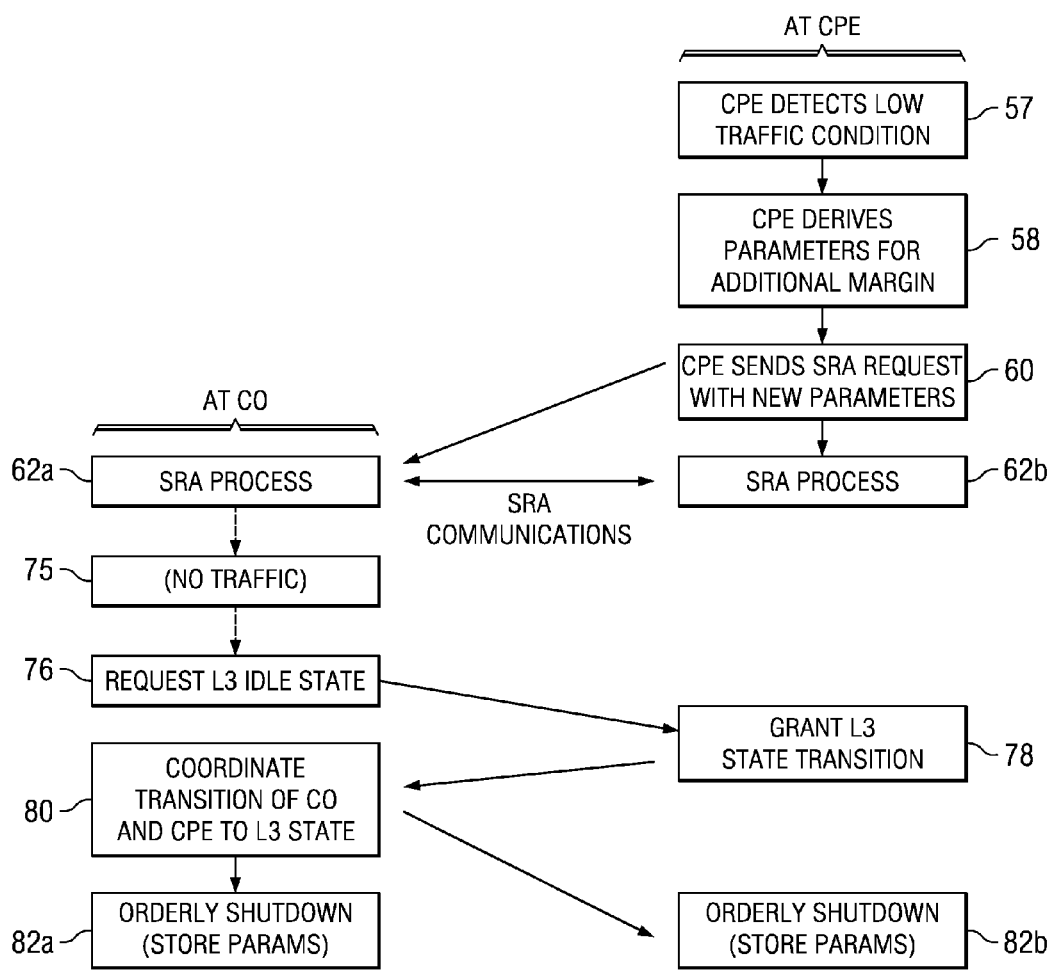
FIG. 5 is a flow diagram illustrating the operation of the central office (CO) and customer premises equipment (CPE) modems in entering the idle L3 state directly from the L0 full-on state, according to the preferred embodiment of the invention.
Figure 6:
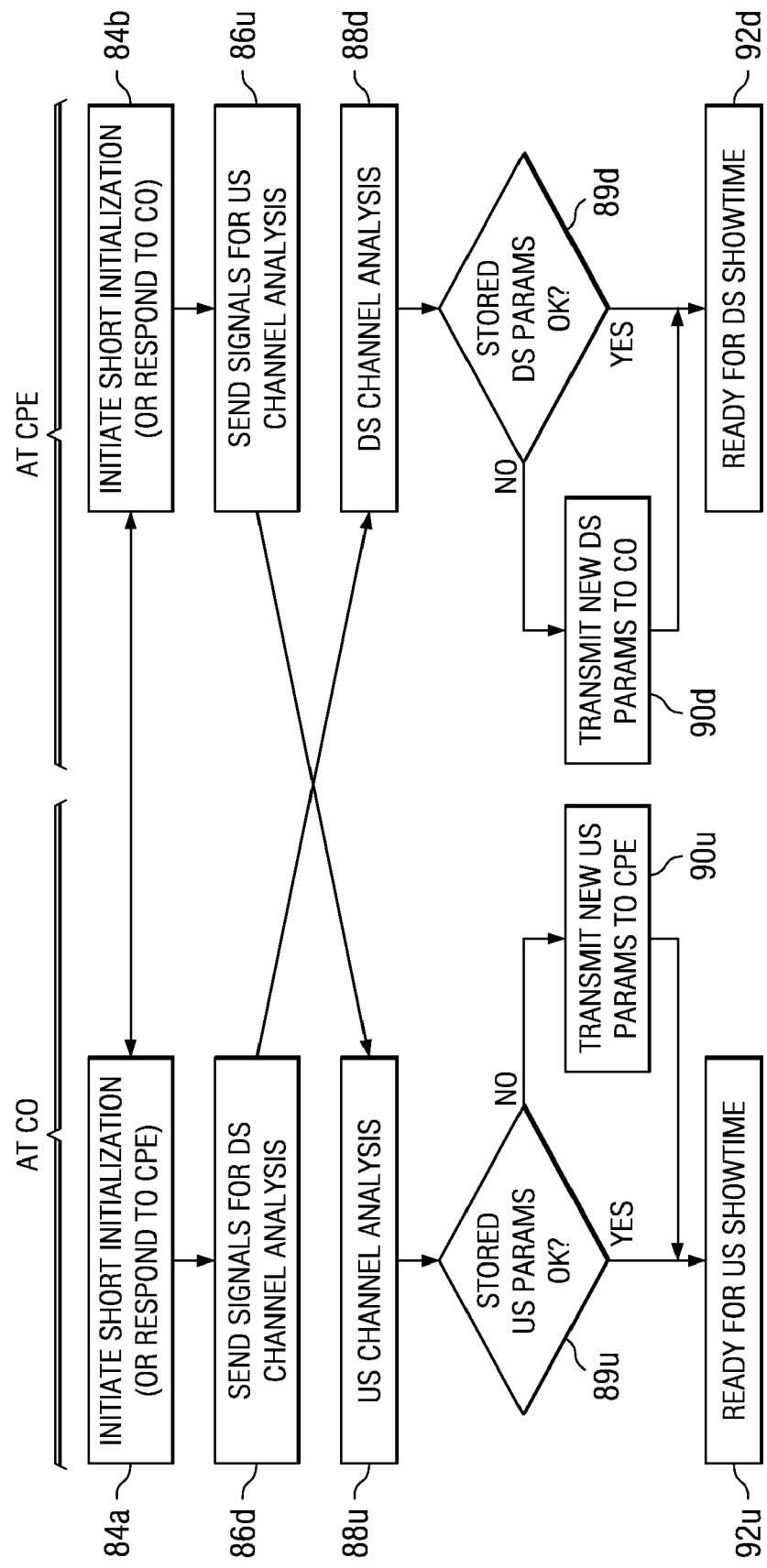
FIG. 6 is a flow diagram illustrating the operation of the short initialization procedure upon exit from the idle L3 state, according to the preferred embodiment of the invention.

Furthermore, it is contemplated that the processes described in this specification with reference to FIGS. 4, 5, and 6 will be performed by the various programmable logic devices, including general purpose processors and digital signal processor functions, in CO modem 30 and CPE modem 40, under the control of program instructions stored in the program memory portion of their various memory resources. While it is contemplated that management subsystem 37 in CO modem 30 and processor 48 in CPE modem 40 will be best suited for managing the operation of the state transitions according to the preferred embodiment of the invention, other programmable functions such as DSP subsystem 35 in CO modem 30 and digital transceiver function 45 in CPE modem 40 may alternatively handle these operations. Further in the alternative, the particular hardware involved in performing these processes may be realized within CO modem 30 and CPE modem 40 in other circuits and functions. Still further, custom or semi-custom logic or other hardware circuits in modems 30, 40 may instead perform the functions described in this specification, although it is believed that the flexibility provided by programmable processors and logic will result in implementations of this preferred embodiment of the invention.

The L0 to L2 transition according to the preferred embodiment of this invention begins in process 56, with CPE modem 40 detecting a low traffic condition for the downstream side of the DSL link. As mentioned above, process 56 typically involves monitoring the volume of data received over the DSL link, for example as a number of active ATM cells over a time window, and comparing the data volume over that time window with a threshold value. The determination of process 56 can be based on other threshold comparisons, for example based on a time-averaging of the received traffic over a specified duration, monitoring the maximum (or minimum) number of ATM cells received over a specified number of time intervals, including transmit (CPE to CO) traffic in combination with the received traffic to ensure that a burst of receive traffic is not expected soon (i.e., in response to heavy transmit traffic), "pinging" the host system to determine whether it is powered on, or the like. In any event, it is preferred that the low traffic condition detected in process 56 is less stringent (i.e., is reached more readily) than the threshold for low traffic that causes CO modem 30 to request entry into the L2 low-power state, because SRA is not permitted (according to current standards) once the L2 state is entered. Regardless of the particular method used to perform detection process 56, according to the preferred embodiment of this invention, in response to CPE modem 40 detecting such a low traffic event, control passes to process 58 in which CPE modem 40 derives a new data rate for the DSL communications session, as will now be described.

As discussed above in connection with the Background of the Invention, the bit rate (i.e., bits per DSL symbol) of a DSL communications session determines the margin y, which is a measure of the ability of the DSL link to tolerate an increase in noise, or some other disturbance or change in the loop condition, without exceeding a bit error rate limit. Also as discussed above, one can express this margin γ in terms of the current signal-to-noise ratio SNR, and the signal-to-noise ratio "gap" of the line code, which is a measure of the efficiency of the line code on an additive white Gaussian noise channel:

$$\gamma = \frac{SNR}{\Gamma(2^b - 1)}$$

where b is the current bit rate (bits per DSL symbol) over all of the subchannels used in the DSL link for the transmission direction being analyzed. In most situations, it is the downstream traffic that is optimized, considering the much higher volume of downstream traffic than upstream traffic over a typical DSL link.

In effect, the margin γ is the ratio of the current signal-to-noise ratio SNR with the signal-to-noise ratio that could be tolerated for the current bit rate b, without exceeding the bit error limit. A DSL communications session that is operating at its maximum achievable bit rate $\bar{b}$ cannot tolerate a substantial increase in noise or a substantial degradation in loop conditions. Accordingly, for a given signal power, the bit rate (i.e., bits per DSL symbol) of a DSL communications session determines the margin, and thus the ability of the session to tolerate additional noise, an acute disturbance, or a sudden change in the loop condition. As such, a DSL communications session that is operating at its maximum achievable bit rate $\bar{b}$ cannot tolerate a substantial increase in noise, or a substantial degradation in loop conditions.

Conventional SRA optimizes the bit rate b for the current conditions of the transmission channel, given a specified value of margin γ. This invention, on the other hand, relies on the converse relationship between bit rate b and margin γ, in that a reduction in the bit rate b can provide additional margin γ, with all other parameters remaining constant.

In process 58 according to the preferred embodiment of this invention, CPE modem 40 reduces the bit rate b of the downstream DSL link, following the detecting of a low traffic situation in process 56. This reduction in bit rate b improves margin γ, which increases the likelihood that, should the L3 idle state be entered following the L2 low-power state, the return from the L3 idle state to the L0 state can be performed more rapidly, without requiring new parameters to be exchanged over the DSL link, even if the loop conditions degrade during the L3 state. While margin γ is improved according to this embodiment of the invention by reducing the bit rate b, other approaches for increasing the operating margin may alternatively be used; for example, the transmit power could be increased (thus increasing the signal-to-noise ratio for the current bit rate b). However, it is contemplated that the reduction in the bit rate b is preferred, for example considering the existing mechanism of SRA under current ADSL standards.

In modern modems operable according to the ADSL standards, and particularly according to the ADSL2 and ADSL2+ standards, CO modem 30 is typically configured with minimum and maximum data rates, as well as several available values, or levels, for margin γ. For example, these available margin values include a target margin $\gamma_{targ}$, as well as values for an SRA upshift threshold $\gamma_{up}$ and an SRA downshift threshold $\gamma_{down}$. In normal operation, if a bit rate b can be achieved while providing a margin value between the minimum bit rate and the maximum bit rate, then CO modem 30 selects target margin $\gamma_{targ}$ for use in the DSL link. During operation, if conditions change so that the actual margin γ falls below minimum margin $\gamma_{min}$, retraining of CO modem 30 and CPE modem 40 is required; conversely, if the actual margin γ increases to better than maximum margin $\gamma_{max}$, CO modem 30 and CPE modem 40 can perform power cutback to reduce power consumption and also to reduce interference on neighboring lines. During showtime, CO modem 30 and CPE modem 40 can perform SRA in the conventional manner, in response to the actual margin γ being outside of the range indicated by SRA upshift threshold $\gamma_{up}$ (causing an increase in bit rate b via SRA) and SRA downshift threshold $\gamma_{down}$ (causing a decrease in bit rate b via SRA). The minimum and maximum connect rates, as well as the margin values $\gamma_{targ}$, $\gamma_{up}$, and $\gamma_{down}$ are used by CO modem 30 during SRA (and initialization), and are transmitted by CO modem 30 to CPE modem 40 in establishing the link.

According to the preferred embodiment of the invention, therefore, a reduction in bit rate b to a new bit rate b' is established using SRA, prior to entry into a low-power state (L2), regardless of the current margin γ value of the link. determined by CPE modem 40 in process 58, preferably determined as a bit rate b' which provides a preselected improvement in the margin γ. Because the DSL link is already in a low traffic situation, as detected by CPE modem 40 in process 56, this reduction in bit rate will have essentially no effect on the actual performance of the communications session.

CPE modem 40 then begins seamless rate adaptation (SRA) for the current DSL link, while the link is still in the L0 full-on state, to implement the new bit rate b'. In process 60, CPE modem 40 sends CO modem 30 a request to begin SRA for the current link in order to implement the new bit rate b'. In response to that request (and assuming a grant response from CO modem 30), CO modem 30 and CO modem 40 execute their respective SRA processes 62a, 62b. Typically, SRA processes will involve the communication of control messages between CO modem 30 and CPE modem 40, including such parameters as new bit rate values, new bit loadings, and new gains; in addition, these control messages will include synchronization information so that CO modem 30 and CPE modem 40 can both comprehend the frame at which the new transmission conditions will take effect. Furthermore, it is contemplated that SRA processes 62a, 62b will be performed at least for downstream communications; SRA of the upstream communications may optionally also be performed. A detailed description of an example of SRA processes 62a, 62b is provided in §10.2.2 of the G.992.3 standard, incorporated by reference above.

Following completion of SRA processes 62a, 62b, communications traffic continues between CO modem 30 and CPE modem 40, in both directions, as shown by process 63 of FIG. 4. It is contemplated that, in many situations in which the traffic is sufficiently low to provoke SRA according to this embodiment of the invention, the level of traffic will soon reach the threshold for causing entry into the L2 low-power state; however, if the downstream traffic resumes a sufficiently high level that the reduced bit rate b' substantially limits the performance of the link (i.e., CPE modem 40 detects that the operating margin γ exceeds the SRA upshift threshold $\gamma_{up}$), SRA will again be performed to increase the bit rate b, in the usual manner.

However, in the event that the downstream traffic remains at a low level, according to this embodiment of the invention CO modem 30 detects this low traffic condition and then requests entry into the L2 low-power state in process 64, by sending to CPE modem 40 a power management request command message containing parameters appropriate to the L2 low-power state. A detailed description of the process of entry into the L2 state is provided in §9.5 of the G.992.3 standard, incorporated by reference above. CPE modem 40 decodes this L2 low-power request message and communicates a grant message to CO modem 30, in return, in process 66. Of course, should CPE modem 40 decline the L2 state transition, it will forward a corresponding message to CO modem 30. In response to the grant message from CPE modem 40, CO modem 30 executes process 68 to send a "sync" symbol to CO modem 30, coordinating the entry of the link into the L2 low-power state and to advising CPE modem 40 of the frame at which the L2 state will be entered. In response to detecting this sync symbol, CPE modem 40 switches its upstream transmit parameters to a set consistent with CO modem 30 being in the L2 low-power state, in process 70. At the frame indicated by CO modem 30 in connection with the sync symbol, CO modem 30 and CPE modem 40 place the DSL link into the L2 state in processes 72a, 72b, respectively. According to the preferred embodiment of this invention, to the extent that communications continue in the L2 state, downstream communications (and possibly also upstream communications) will be at a lower bit rate, to provide additional margin as discussed above.

Once in FIG. 4, CO modem 30 continues to monitor traffic (as does CPE modem 40), and coordinates a transition to the L3 idle state if traffic ceases all together. According to this embodiment of the invention, in the event that CO modem 30 eventually detects the absence of traffic in either direction for a specified duration, during its current L2 low-power state (process 74), CO modem 30 then issues a request to enter the L3 idle state, by transmitting a message to CPE modem 40, in process 76. In response (and assuming that no reason exists to deny this transition), CPE modem 40 grants this request, communicating a grant message to CO modem 30 in return, in process 78. CO modem 30 then coordinates the transition of itself and CPE modem 40 into the L3 idle state, in process 80. This entry into the L3 state, coordinated in process 80, preferably follows the approach described at §9.5 of the G.992.3 standard incorporated by reference above, including the "orderly" shutdown of both CO modem 30 and CPE modem 40 in processes 82a, 82b, respectively.

According to this embodiment of the invention, the values of those parameters relating to the DSL link most recently established, following the reduction in bit rate to bit rate b' as performed by CO modem 30 in processes 60, 62a, 62b, are either retained or stored at each of CO modem 30 and CPE modem 40, for both directions of transmission, in processes 82a, 82b. For the example of ADSL2 and ADSL2+ DSL communications, these parameters that are stored in processes 82a, 82b include frame multiplexor control parameters $L_p$, and the "bits and gains" $b_i$, $g_i$. The $L_p$ parameters specify the number of bits communicated for each latency path p, in each transmission direction, of each data frame, as defined in the G.992.3 standard incorporated above. The "bits" $b_i$ specify the bit loading for subchannel i, and the "gains" $g_i$ specify the scale factor to be applied to that subchannel i, relative to the nominal gain for that subcarrier as used in channel analysis; these "bits and gains" $b_i$, $g_i$ are stored in memory resources of CO modem 30 and CPE modem 40, also for each transmission direction.

The flow diagram of FIG. 4 illustrates one way in which the L3 idle state is entered for a DSL link, according to the preferred embodiment of the invention, specifically via the L2 low-power state. FIG. 5 illustrates an alternative way in which the L3 idle state is entered, specifically in which the L3 state is entered directly from the L0 full-on state, as will now be described. Processes shown in FIG. 5 that are the same as processes previously described relative to FIG. 4 will be referred to by the same reference numerals.

The method of FIG. 5 begins with the DSL link between CO modem 30 and CPE modem 40 operating in the L0 full-on state. In process 57, CPE modem 40 detects a "low traffic" condition, in which a relatively low level of traffic is received by CPE modem 40 over a preselected time duration. This low traffic condition of process 57 is preferably less stringent (i.e., is more readily reached) than the "low traffic" threshold used by CO modem 30 in determining whether to enter the L3 idle mode (or the L2 low-power mode, for that matter); preferably, the condition detected in process 57 may be the same as that used in process 56 of FIG. 4. According to this embodiment of the invention, as before, because the "low traffic" condition occurred during the L0 state, CPE modem 40 executes process 58 to derive transmission parameters that will improve the operating margin $\gamma$. As discussed above, process 58 may derive these parameter values according to various approaches for increasing the operating margin; for example, the transmit power could be increased, thus increasing the signal-to-noise ratio for the current bit rate. Preferably, according to this embodiment of the invention, these new transmission parameters are selected to derive a reduced bit rate b' for the current DSL link, to provide additional operating margin as described above, in the absence of any degradation in channel conditions or increased noise. This lower bit rate b' will provide additional tolerance and immunity for any increases in noise that may arise during the L3 idle state. Preferably, the new bit rate b' is selected to provide a selected percent (or dB) of additional margin $\gamma$. In process 60, CPE modem 40 sends an SRA request to CO modem 30, to seamlessly implement the new bit rate b'.

As in the previously described embodiment of the invention, CO modem 30 and CPE modem 40 next execute SRA processes 62a, 62b, respectively, to implement the transmission parameters corresponding to a DSL link at this new reduced bit rate b'. As described above, SRA processes 62a, 62b will involve the communication of control messages between CO modem 30 and CPE modem 40, including such parameters as new bit rate values, new bit loadings, and new gains, along with synchronization information regarding the frame at which the new transmission conditions will take effect, at least for downstream communications but also optionally for upstream communications.

Following completion of SRA processes 62a, 62b, the current level of traffic continues (indeed, it continues during processes 62a, 62b because of the "seamless" nature of the SRA procedure, as known in the art), in process 75. CO modem 30 continues to monitor this traffic. If CO modem 30 detects a "no traffic" state over time, at some point a threshold value is reached, and CO modem 30 issues a request to enter the L3 idle state, by way of a message transmitted to CPE modem 40 in process 76. CPE modem 40 grants this request in process 78, communicating a grant message to CO modem 30 in return. CO modem 30 then coordinates the transition of itself and CPE modem 40 into the L3 idle state, in process 80. An "orderly" shutdown is then performed by CO modem 30 and CPE modem 40, including the storing or retention of transmission parameters corresponding to full-on (L0 state) DSL communications for the new reduced bit rate b' resulting from SRA processes 62a, 62b. For the example of ADSL2 and ADSL2+ communications, these parameters include frame multiplexor control parameters $L_p$, and the "bits and gains" $b_i$, $g_i$, for both transmission directions.

According to the preferred embodiment of the invention, once CO modem 30 and CPE modem 40 for a given DSL link are placed into the L3 idle state, regardless of whether the transition to the L3 state came through the L2 low-power state or direction from the L0 full-on state, a short initialization procedure is required in making the transition back to the L0 full-on state, for example in response to demand for traffic by one of CO modem 30 or CPE modem 40. And according to this preferred embodiment of the invention, SRA processes 62a, 62b increase the likelihood that transition back to the L0 state will not require the communication of parameters between the modems, because of the improvement in the margin γ resulting from the reduced bit rate b'.

The short initialization procedure from the L3 state to the L0 state, according to this embodiment of the invention, will now be described with reference to FIG. 6. This transition from the L3 state is applicable regardless of the manner in which the L3 state was entered (i.e., regardless of whether the process of FIGS. 4a and 4b, or the process of FIG. 5, was followed). According to this embodiment of the invention, and as shown by processes 84a, 84b, this transition to the L0 state ("L3 exit") can be initiated by either CO modem 30 or by CPE modem 40 making a request to the other modem, in response to which the non-initiating modem will respond with the L3 grant signal (because that modem is in an idle state). Following this request-acknowledgement sequence, the short initialization process can begin, for example following the procedure described at §8.14 of the G.992.3 standard, incorporated by reference above. This short initialization procedure omits certain processes that are otherwise performed in normal initialization, such as "G.994.1" handshaking and spectral shaping estimation, and includes shortened processes for such functions as channel estimation and equalizer training, as described in the G.992.3 standard.

As part of the short initialization procedure, CO modem 30 transmits signals to CPE modem 40 over the link, in process 86d, based upon which CPE modem 40 can perform channel analysis for the downstream direction, in process 88d. Similarly, and perhaps simultaneously, in process 86u, CPE modem 40 transmits signals over the link to CO modem 30, for use in upstream channel analysis by CO modem 30 in process 88u. The transmission of upstream and downstream channel analysis signals (processes 86d, 86u) is limited in this short initialization procedure, for example to no more than 1024 symbols in each direction.

According to the preferred embodiment of this invention, following the shortened channel analysis of processes 88u, 88d, each of CO modem 30 and CPE modem 40 determine whether the last set of stored parameters, corresponding to the reduced bit rate b' and the corresponding SRA processes, are still adequate for DSL communications under the current channel conditions measured and analyzed in processes 88d, 88u. CO modem 30 executes this determination in decision 89u for upstream communications, based on upstream channel analysis process 88u. Similarly, CPE modem 40 executes decision 89d for downstream communications, based on downstream channel analysis process 88d. If the stored upstream parameters are not adequate (decision 89u is NO), CO modem 30 transmits new parameters $L_i$, $b_i$, $g_i$, to CPE modem 40 in process 90u. Similarly, if the stored downstream parameters are not adequate to achieve the desired bit error rate under current channel conditions (decision 89d is NO), then CPE modem 40 communicates new downstream parameters to CO modem 30 in process 90d. Showtime in either direction can then begin (processes 92u, 92d) following communication of these new parameters.

On the other hand, showtime can begin without parameter exchange if the reduced bit rate b' parameters are sufficient to meet the bit error rate target, under current channel conditions. Specifically, if the stored upstream parameters are adequate (decision 89u is YES), CO modem 30 need not transmit any parameters $L_i$, $b_i$, $g_i$, to CPE modem 40, because those parameters are already stored and maintained in both CPE modem 40 and CO modem 30. Showtime for upstream communications can begin immediately (process 92u). Similarly, if the stored downstream parameters are adequate to achieve the desired bit error rate under current channel conditions (decision 89d is YES), CPE modem 40 need not communicate new downstream parameters to CO modem 30, and downstream showtime can begin (process 92d).

During operation in the L0 full-on state, SRA can subsequently be performed to increase the bit rate b back to its original level, or such other higher bit rate level as may then be available, because the additional margin γ is then not required for L0 state operation.

According to this invention, substantial improvement in the efficiency with which DSL modems and transceivers can transition from an idle state to a full power operating state can be attained. This substantial improvement is made available by changing transmission parameters to obtain additional operating margin, prior to entering the idle state. As a result of this additional operating margin, the likelihood is increased that these prior parameters can meet the bit error rate requirements, upon re-initializing the link from the idle state. This reduces the frequency at which re-initialization from the idle state requires communications of new parameters over the link.

This improved efficiency is contemplated to be especially important in connection with new and modem applications of DSL communications, particularly in providing VoIP telephone services. The current "short" initialization procedure takes approximately one second using current technology, if parameters are not communicated. It is believed that this one second delay is near the limit that can be tolerated by many users, especially in waiting for a dial tone when placing a VoIP call, or in waiting for an answer following pick-up by a VoIP call recipient. However, the communication of parameters upon re-initialization can require up to an additional 0.3 seconds for the upstream communication of the downstream parameters. Because the short initialization procedure already requires about one second, it is contemplated that this additional time would be quite noticeable. Accordingly, it is believed that the improvement provided by this invention will have significant impact in the marketplace, while being achievable at relatively low cost, without requiring hardware modifications, and without impacting the payload data rates.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method for operating a digital subscriber line communications system, comprising the steps of:

operating a first modem to transmit data to a second modem over a communications facility;

during the operating step, sensing a condition of communications traffic between a first modem and a second modem;

responsive to the sensing step, generating modified transmission parameters to increase an operating margin of the communications;

storing the modified transmission parameters at each of the first and second modems;

placing the first modem in a low power state;

then executing a short initialization procedure; and then operating the first modem to transmit data to the second modem using the stored transmission parameters.

2. The method of claim 1, wherein the modified transmission parameters correspond to an increased transmit power level.

3. The method of claim 1, wherein the operating step comprises:

operating the first modem to transmit data to the second modem over the communications facility using a first set of transmission parameters corresponding to a first bit rate per symbol;

and wherein the modified transmission parameters correspond to a reduced bit rate per symbol relative to the first bit rate per symbol.

4. The method of claim 1, further comprising:

after the step of generating the modified transmission parameters and before the step of executing the short initialization procedure, operating the first modem to transmit data to the second modem using the modified transmission parameters.

5. The method of claim 1, wherein the condition of communications traffic corresponds to a low traffic condition.

6. The method of claim 1, further comprising:

after the step of placing the first modem in a low power state, sensing an absence of communications traffic between the first modem and the second modem; and then placing the first and second modem into an idle state, after the storing step.

7. The method of claim 1, wherein the condition of communications traffic corresponds to an absence of communications traffic between the first modem and the second modem.

8. The method of claim 7, wherein the low power state is an idle state;

and wherein the step of placing the first modem in the low power state is performed after the storing step.

9. The method of claim 8, further comprising:

after the storing step, placing the second modem into an idle state.

10. The method of claim 1, wherein the short initialization procedure comprises:

communicating signals from the first modem to the second modem over the communications facility; and operating the second modem to analyze the signals from the first modem, to determine whether the modified transmission parameters meet a bit error rate level;

wherein the step of operating the first modem to transmit data to the second modem using the stored transmission parameters is performed responsive to the modified transmission parameters meeting the bit error rate level.

11. The method of claim 1, wherein the step of executing the short initialization procedure is performed responsive to a request from either the first modem or the second modem.

12. The method of claim 1, wherein the step of generating modified transmission parameters comprises a seamless rate adaptation process according to the International Telecommunication Union ITU G.992.3 digital subscriber line (DSL) standard.

13. The method of claim 1, wherein the step of operating the first modem to transmit data to the second modem operates the first modem to transmit data in the form of a discrete multitone modulation signal.

14. The method of claim 13, wherein the operating step further comprises operating the second modem to transmit data to the first modem over the communications facility, also in the form of a discrete multitone modulation signal.

15. A method of operating a customer premises equipment (CPE) modem in a digital subscriber line (DSL) communications system, comprising the steps of:

receiving downstream discrete multitone modulation (DMT) signals from a central office (CO) modem, over a communications facility comprising twisted-pair wire, and according to a first set of transmission parameters corresponding to a first bit rate and a current condition of the transmission channel between the CO modem and the CPE modem;

sensing a traffic condition in the downstream traffic from the CO modem;

responsive to the sensing step, deriving a second set of transmission parameters corresponding to an increased operating margin in the downstream traffic;

transmitting signals to the CO modem in connection with a seamless rate adaptation procedure, to establish communications according to the second set of transmission parameters;

storing the second set of transmission parameters;

then transmitting signals to the CO modem and receiving signals from the CO modem to execute a short initialization procedure; and then receiving downstream DMT signals from the CO modem, over the communications facility, according to the second set of transmission parameters.

16. The method of claim 15, wherein the second set of transmission parameters correspond to an increased transmit power level.

17. The method of claim 15, wherein the second set of transmission parameters correspond to a second bit rate, the second bit rate being a reduced bit rate per symbol relative to the first bit rate.

18. The method of claim 15, further comprising:

after the step of transmitting signals to the CO modem in connection with the seamless rate adaptation procedure, and before the step of transmitting signals to the CO modem and receiving signals from the CO modem to execute the short initialization procedure, receiving downstream DMT signals to the CPE modem, over the communications facility, according to the second set of transmission parameters.

19. The method of claim 18, wherein the traffic condition corresponds to a low traffic condition;

and further comprising:

then entering an idle state, after the storing step.

20. The method of claim 15, wherein the traffic condition corresponds to an absence of communications traffic over the communications facility with the CO modem;

and further comprising:

entering a reduced power state, after the storing step.

21. The method of claim 15, further comprising:

during the step of receiving signals from the CO modem to execute the short initialization procedure, determining whether DMT signals received over the communications facility according to the second set of transmission parameters are adequate to meet a bit error rate level;

wherein the step of receiving downstream DMT signals from the CO modem, over the communications facility, according to the second set of transmission parameters, is performed responsive to determining that the second set of transmission parameters are adequate to meet the bit error rate level;

and further comprising:

responsive to determining that the second set of transmission parameters are not adequate to meet the bit error rate level, deriving a third set of transmission parameters.

22. A modem for digital subscriber line (DSL) communications, comprising:

an analog front end, for coupling to a communications facility comprising twisted-pair wire;

transmit and receive digital filters, coupled to the analog front end, for filtering signals to be transmitted and signals received, respectively, in the digital domain;

an interface for coupling to a system element; and circuitry, coupled to the digital signal processing circuitry, for performing a sequence of operations comprising:

demodulating signals over a plurality of subcarriers according to a first set of transmission parameters corresponding to a first bit rate and a current condition of a transmission channel to which the modem is coupled over the communications facility;

sensing a traffic condition for signals being received by the modem;

responsive to the sensing operation, selecting a second set of transmission parameters corresponding to an increased operating margin;

transmitting signals over the communications facility in connection with a seamless rate adaptation procedure, to establish communications according to second set of transmission parameters;

storing the second set of transmission parameters;

then executing a short initialization procedure; and then modulating signals over the plurality of subcarriers according to the second set of transmission parameters.

23. The modem of claim 22, wherein the circuitry comprises:

programmable circuitry for executing instructions; and program memory, coupled to the programmable circuitry, for storing a sequence of instructions corresponding to the sequence of operations.

24. The modem of claim 23, wherein the programmable circuitry comprises:

digital signal processing circuitry, for executing instructions corresponding to the demodulating operation into received data to be presented according at the interface, and also for executing instructions for modulating signals received at the interface; and management circuitry, for executing instructions corresponding to the sensing, selecting, placing, storing, and executing operations.

* * * * *